United States Patent [19]
Freeman

[11] Patent Number: 5,553,932
[45] Date of Patent: Sep. 10, 1996

[54] WHEEL CLEANING SYSTEM

[76] Inventor: Ernie Freeman, 1460 W. 130th St., Brunswick, Ohio 44212

[21] Appl. No.: 510,461

[22] Filed: Aug. 2, 1995

Related U.S. Application Data

[63] Continuation-in-part of Ser. No. 274,837, Jul. 14, 1994, Pat. No. 5,451,100, which is a continuation of Ser. No. 942,433, Sep. 9, 1992, Pat. No. 5,330,260.

[51] Int. Cl.⁶ .............................................. B62D 55/088
[52] U.S. Cl. ........................................................... 305/107
[58] Field of Search ............................................ 305/11–13

[56] References Cited

U.S. PATENT DOCUMENTS

| | | | |
|---|---|---|---|
| 2,560,307 | 7/1951 | Slemmons | 305/12 |
| 4,198,103 | 4/1980 | Ward et al. | 305/12 |
| 4,818,040 | 4/1989 | Mezzancella et al. | 305/12 |
| 4,830,439 | 5/1989 | Collins et al. | 305/12 X |
| 5,330,260 | 7/1994 | Freeman | 305/12 |
| 5,370,451 | 12/1994 | Brownlee et al. | 305/12 |
| 5,451,100 | 9/1995 | Freeman | 305/12 |

*Primary Examiner*—Russell D. Stormer
*Attorney, Agent, or Firm*—Pearne, Gordon, McCoy & Granger

[57] ABSTRACT

In a refuse compactor, a set of cutter blades, one on each wheel and one fixed relative to the wheel's associated axle operable to cut refuse entrained by the wheel and tending to be wrapped around the associated axle so as to avoid the build-up of refuse on the axle which otherwise can lead to unnecessary wear of the wheel and drive train as well as unnecessary fuel consumption.

2 Claims, 4 Drawing Sheets

WHEEL CLEANING SYSTEM

This application is a continuation-in-part of application Ser. No. 08/274,837, filed Jul. 14, 1994, now U.S. Pat. No. 5,451,100 which application is a continuation of application Ser. No. 07/942,433, filed Sep. 9, 1992, now U.S. Pat. No. 5,330,260.

BACKGROUND OF THE INVENTION

The present invention relates to improvements in land vehicles and, in particular, to tractors used to compact refuse at a landfill.

PRIOR ART

The capacity of existing landfills has greatly diminished and the cost of establishing new landfills has greatly escalated due to environmental concerns. Thus, it is important that refuse materials deposited in a landfill be compacted as fully as is practical. To this end, specialized heavy tractors have been developed to spread and roll over newly received refuse. Currently, these tractors are fitted with large steel wheels that include projections that operate to disintegrate the refuse while it is being compacted by the pressure of the wheels. A serious problem has existed with the operation of this kind of equipment where refuse tends to be tightly wrapped around the wheel axles as the wheels rotate. Materials such as sheet metal, metal bar, pipe, rugs and other sinewy components are entrained by a wheel causing it to wrap around its associated axle. Typically, the wheel center is hollow and the entrained material accumulates around the axle and in the inboard side of the wheel.

The accumulation of refuse on the axle and in the wheel has several disadvantages. A large drag resisting wheel rotation is produced causing unnecessary fuel consumption. The drive train is subjected to unnecessary wear to overcome this drag or resistance. The wheels, which are relatively expensive, wear out prematurely because the refuse accumulated on the axle rubs against the wheel surfaces causing severe abrasion.

Complicating this situation is the lack of any quick, practical way of removing the accumulated material from its entanglement with an axle and wheel. The practice is to remove the material with hand labor and this is dangerous to the workman. There is a risk of grasping a razor sharp edge of a broken or torn article hidden in various unsanitary debris and even heavy gloves may not afford sufficient protection to the workman's hands.

SUMMARY OF THE INVENTION

The invention provides a method and apparatus for eliminating the build-up of harmful accumulations of refuse material around the axle of a refuse compactor. The apparatus comprises a pair of cutter blades associated with a wheel and its respective axle. One of the cutter blades is fixed on the wheel and the other is fixed with respect to the axle. Rotation of the wheel causes its cutter to revolve in a path that sweeps sufficiently close to the fixed cutter to produce a shearing or cutting action therewith. Material entrained by a wheel that begins to be wrapped around an axle is severed by the pair of blades. The severing action prevents the material from being wound in multiple ever-tightening turns. Once the material is severed, it tends to fall off the axle area thereby avoiding a build-up of the same.

In the preferred embodiment, the cutter blades include edges that are in general parallel alignment with the wheel axis. Additionally, the areas forming the blade edges are plate-like in configuration and can operate in either direction of rotation of the wheel. The disclosed cutter blades are arranged to be retrofitted on existing tractors.

In one version of the invention, a stationary blade structure fixed with respect to the axle comprises at least two plate sections oriented at right angles to one another and providing a cross cutting edge in parallel alignment with the axle and a radial cutting edge in a plane perpendicular to the axle. The rotational cutter blade similarly has two cutting edges one for each of the cross cutting and radial cutting edges of the stationary plate sections.

In another version of the invention, a stationary blade structure fixed with respect to the axle comprises a plate having spaced cutting edges, both parallel to the axis. The cutting edges are arranged along the path of the wheel or rotational cutter blade so that they both are capable of cooperating with the rotational cutter blade at different angular positions of the wheel.

Both disclosed versions of the fixed cutter blade structures afford a highly effective trash cutting and wheel cleaning system with an extended service life.

DESCRIPTION OF THE PREFERRED EMBODIMENT

The disclosures of U.S. Pat. No. 5,330,260 and U.S. patent application Ser. No. 08/274,837 are incorporated in their entireties herein by reference.

Figure 1:
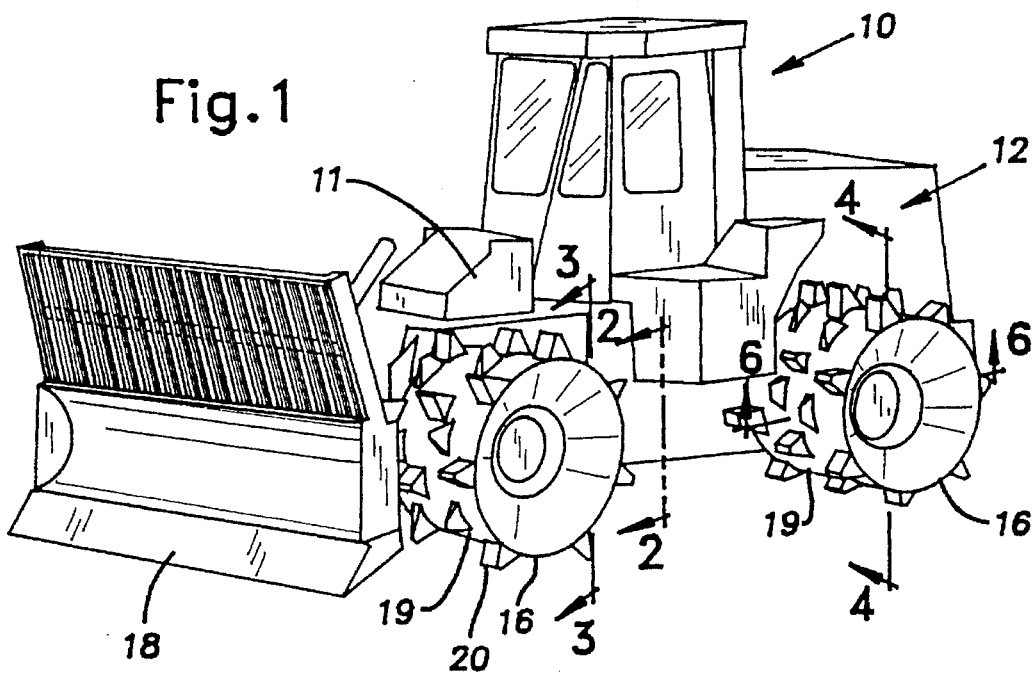
FIG. 1 is a perspective view of a refuse compactor employing the present invention.
Figure 2:
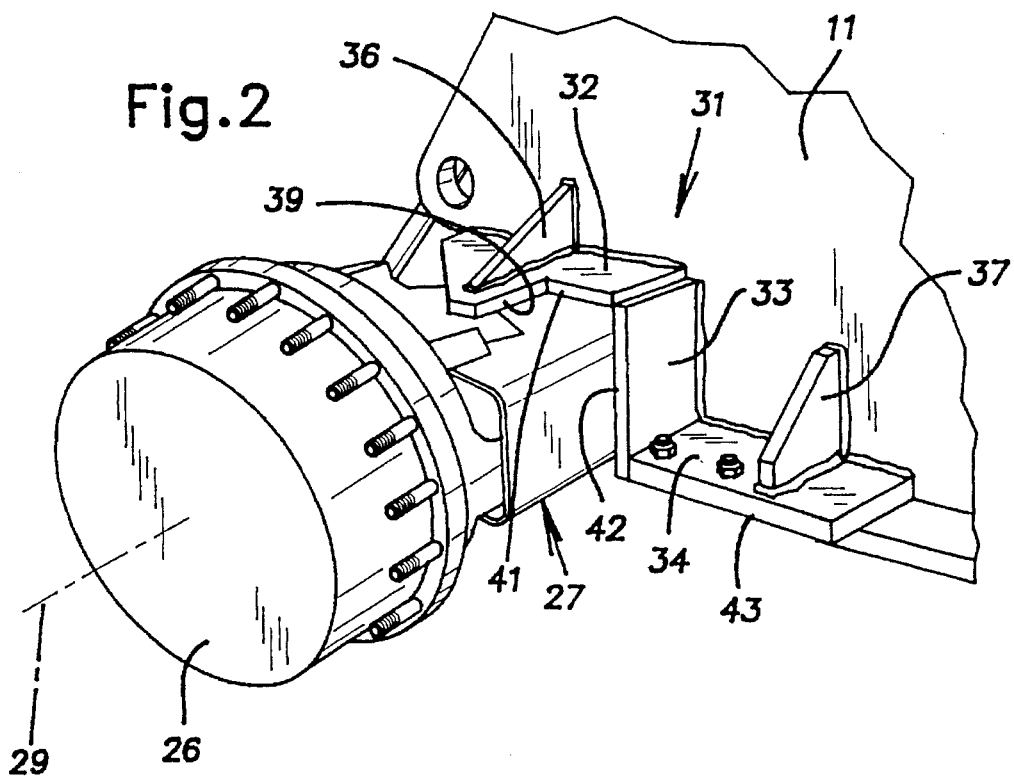
FIG. 2 is a perspective view of a portion of the left front axle and associated stationary cutter plate unit of the invention taken from a view indicated generally by the reference arrows 2—2 in FIG. 1.

A large self-propelled four-wheeled tractor illustrated in FIG. 1 is known in the landfill industry as a compactor. Commonly known examples of such tractors are machines marketed by Caterpillar, Inc. under the model designations CAT 826C; CAT 816B and CAT 836. A compactor 10 includes a chassis 11 on which is carried an engine and drive train generally indicated at 12 that propel the front and rear wheels 16 selectively for either forward or backward rotation. An adjustable blade 18 at the front of the compactor chassis 11 is used to distribute refuse in a landfill while the wheels 16 compact the same as the compactor 10 rolls back and forth over the landfill area being filled. Typically, the wheels 16 are large diameter steel weldments.

A wheel 16 includes an outer cylindrical rim or thread 19 on which are fixed a multitude of projecting teeth 20 that tend to cut and otherwise disintegrate the refuse being compacted. The center of a wheel 16 is comprised of a pair of truncated steel cones 21, 22 at the inboard and outboard wheel sides, respectively. The center cones 21, 22 are arranged so that each face of the wheel is concave. The outer peripheries of the cones, 21, 22 are welded to the thread cylinder and the inner peripheries are welded to a cylindrical tubular hub 23. A mounting flange 24 on the inner periphery of the hub 24 has a series of spaced holes for mounting the wheel 16 to a final drive unit 26 of a respective axle 27 or 28. The front axle is shown at 27 and its wheel and axle axis is shown at 29.

In accordance with the invention, a cutter blade assembly 31 is installed on the chassis 11 in fixed relation to the associated front axle 27. In the illustrated case, the front axle 27 is rigidly fixed to the chassis or frame 11. The cutter blade assembly or structure 31 is a weldment of heavy flat steel plates 32–34 of, for example, 1½ inch hot rolled steel on larger machines and proportionately thinner on smaller machines. The plates 32–34 and gusset reinforcing plates 36, 37 are, in the illustrated case, welded directly to the chassis frame 11 and are spaced from the axle axis 29. The upper plate 32 includes a cross cutting edge 39 that is generally parallel to the axis 29 of the front axle 27.

The outboard or free end of the upper cutter plate 32 can, as shown, extend at least partially into the cavity of the associated wheel 16 formed by the inboard center cone 21. A portion of the upper plate 32, the intermediate vertical plate 33 and lower horizontal plate 34 each include a respective cutting edge 41–43 all lying in a common plane perpendicular to the axis 29 of the axle 27.

Figure 4:
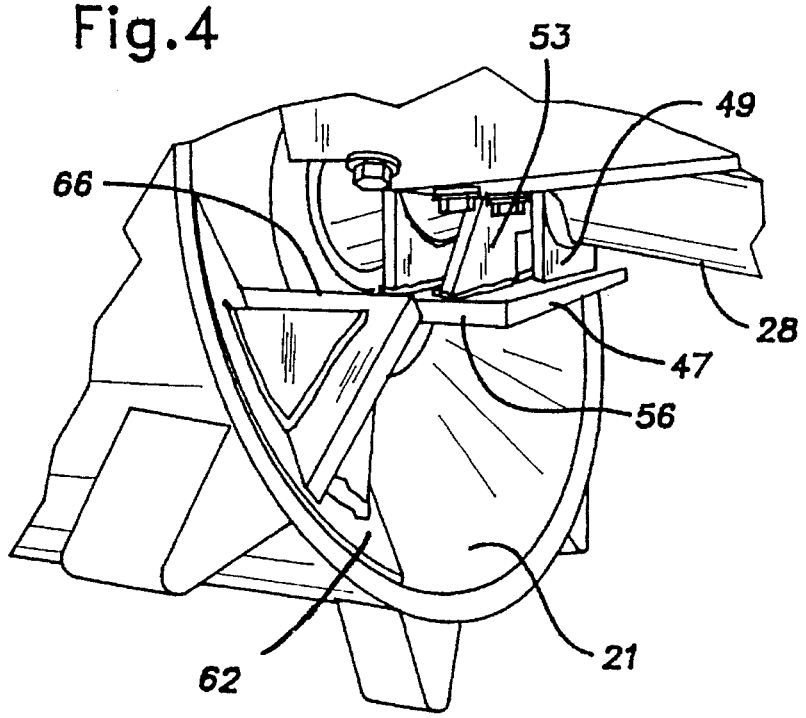
FIG. 4 is a fragmentary perspective view of a cutter plate unit associated with the left side of the rear axle of the compactor taken from a view indicated generally by the reference arrow 4—4 in FIG. 1.
Figure 5:
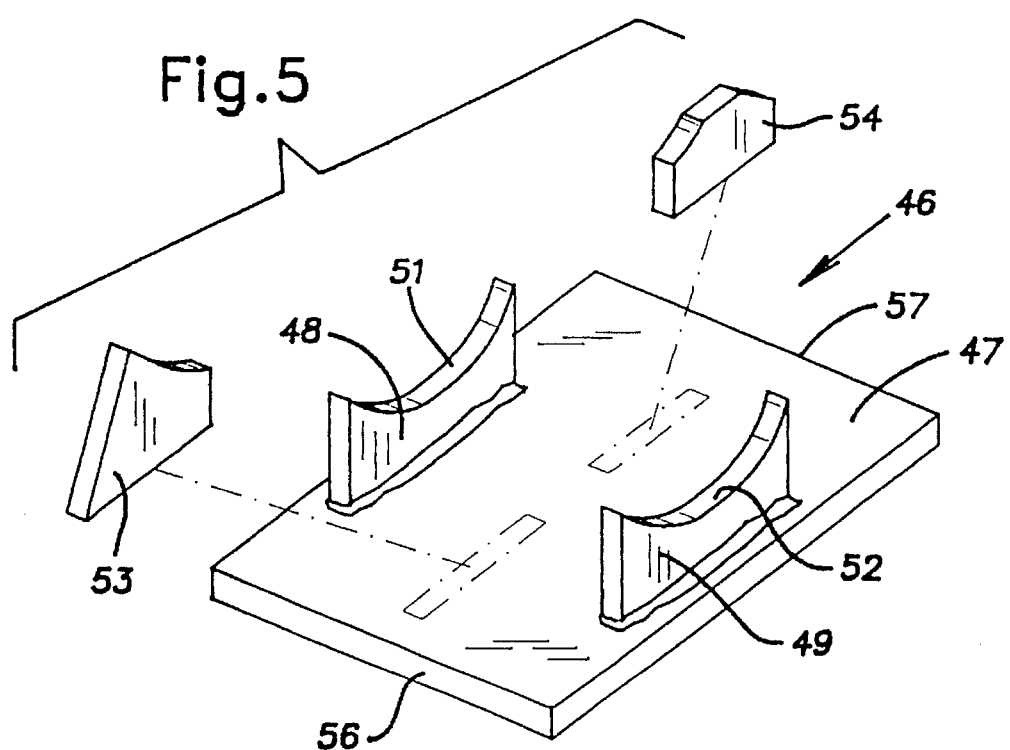
FIG. 5 is a perspective, partially exploded view of the left rear cutter plate unit.
Figure 6:
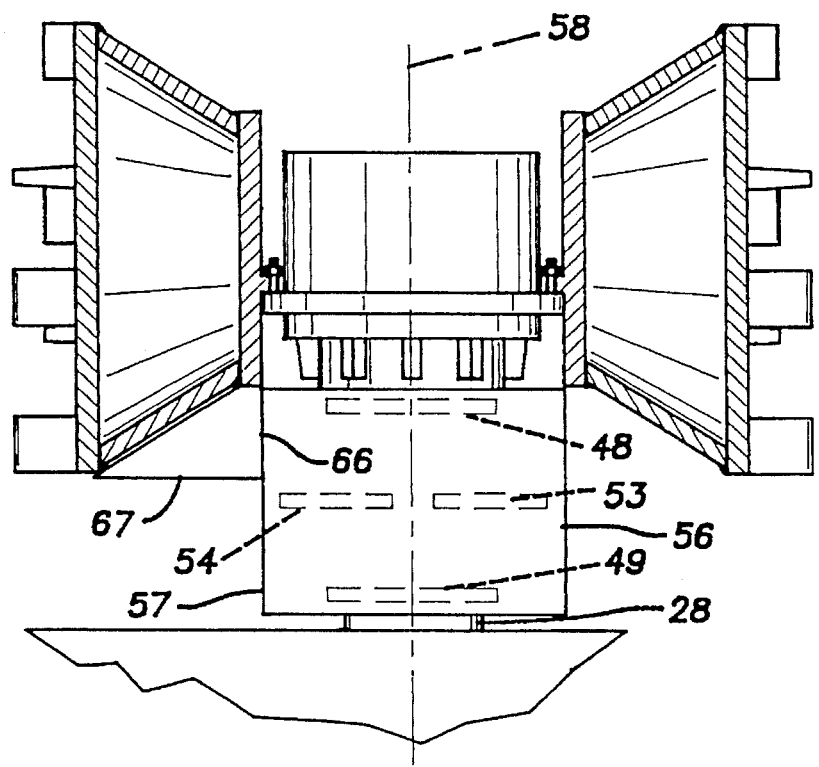
FIG. 6 is a view of the left rear cutter plate unit, and the associated wheel cutter unit, from below, as indicated by the reference arrows 6—6 in FIG. 1.

The rear axle 28 is also provided with a cutter blade assembly or structure 46 shown in FIGS. 4–6. The cutter blade assembly 46 is fabricated as a weldment of heavy steel plate of, for example, 1½ inch thick hot rolled steel on larger machines and proportionately thinner on small machines. The assembly 46 includes a horizontal, generally rectangular plate 47 and two generally vertical saddle plates 48, 49. The saddle plates 48, 49 are welded to the plate 47 in spaced parallel alignment and, at their upper ends include arcuate surfaces 51, 52 that are configured to match the housing of the rear axle 28. The cutter blade assembly 46 is installed on the axle 28 by registering the surfaces 51, 52 against the housing or tube of the axle 28 and welding the plates 48, 49 directly to the tube. Thereafter, a pair of gussets 53, 54 are positioned on the plate 47 and against opposite sides of the axle 28. The gussets 53, 54 are then welded in position to increase the rigidity of the structure 46. The plate 47 includes a pair of oppositely facing cutting edges 56, 57 parallel to the axis, designated 58, the rear axle 28, the cutting edges 56, 57 extend into the cavity of the associated wheel 16 formed by the inboard cone 21. The front and rear axles 27, 28 on the right side of the compactor 10 are provided with cutter blade assemblies or structures which are mirror images of the described structures 31, 46.

Figure 7:
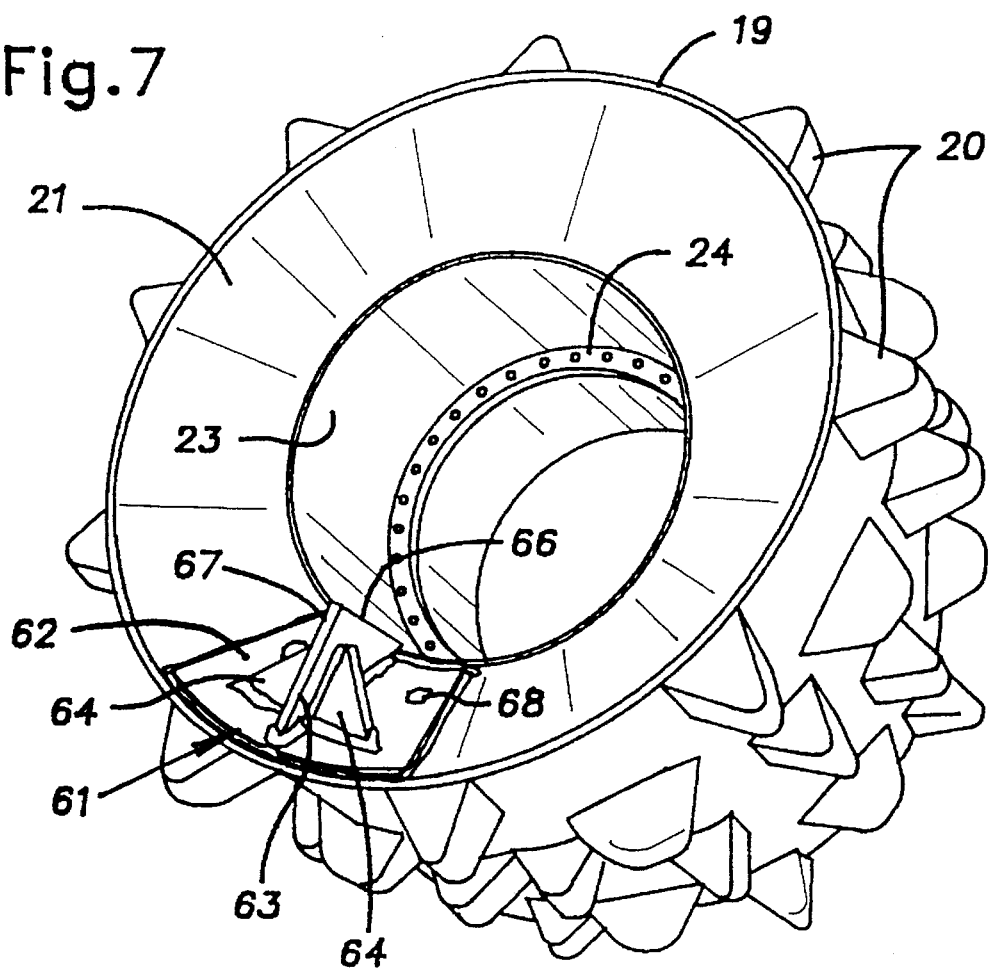
FIG. 7 is a perspective view of an inside face of a typical wheel.

FIG. 7 shows the inside face of a typical wheel 16 in perspective. A wheel cutter blade assembly 61 is fixed to the inboard wheel center or cone 21 as by welding. The cutter blade assembly 61 is a heavy steel plate weldment of hot rolled steel and includes a mounting base plate 62 of, for example, ⅝ inch thickness, a triangular cutter plate or blade 63 of 1½ inch thickness (on larger machines), and a pair of triangular gussets 64 of one inch or ¾ inch thicknesses on opposite sides of the cutter plate 63 bracing the cutter plate against deflection out of its plane. The mounting base plate 62 preferably has a geometry that is complementary to the exposed surface of the center cone 21 such that it has a surface that has a conical configuration which is essentially the same as the exposed surface of the center cone. A convenient way of fabricating the base plate 62 is to roll a steel plate into a cone that closely fits into the exposed face of the center cone 21 and to cut the rolled cone into segments analogous to slices of a pie of suitable arcuate extent. The cutter plate 63 includes a cutting edge 66 that is parallel and spaced from the axis of the wheel which when installed is coincident with the axis of the axles 27 and 28. Additionally, the cutter plate 63 has a cutting edge 67 that is in a radial plane perpendicular to the axis of the wheel 16.

The cutter blade assembly 61 is fixed to the wheel 16 by welding the periphery of the mounting base plate 62 to the center cone 21 and by plug welding through preformed holes in the mounting base at points designated by the numeral 68. The dimensions of the mounting base 62 in a plane perpendicular to the cutting plate 63 are of the same order of magnitude as the major dimensions of the cutting plate to yield a rugged stable assembly with the wheel 16 when welded thereto as described. Preferably, each of the wheels 16 are constructed in essentially the same manner and are fitted with cutter blade assemblies 61 that are essentially identical.

The cutter plate 63 is relatively large so that it presents its cutting edges 66 and 67 to the associated cutting edges of the stationary cutters 31, 46 at a considerable distance from the inner face of the wheel. This ensures that the debris will be cut efficiently without undue abrasion against the wheel. By way of example, on a relatively large machine where the wheel diameter is in the order of 60", the edge 66 can have a length of about 15 inches and the edge 67 can have a length of about 14½ inches.

Figure 3:
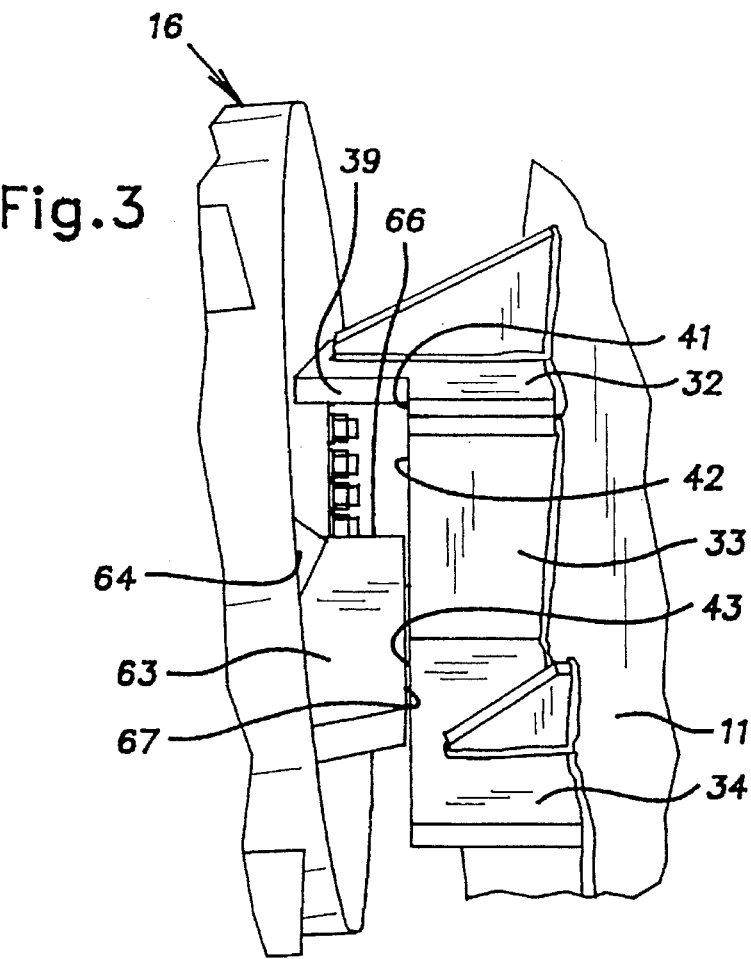
FIG. 3 is a fragmentary elevational view of the cutter plate unit of FIG. 2 and an associated wheel cutter plate unit taken from the view indicated generally by the reference arrows 3—3 in FIG. 1.

As shown in FIGS. 3 and 6 the fixed cutter blade structures 31 and 46 are aligned with the associated wheel cutter blade or plate 63 on each wheel such that they have substantially the same location along the axis of the respective axle 27, 28. The various parts are proportioned so that there is a slight clearance of, for example, ⅛ inch between the respective cutting edges 39 to 66, 41–43 to 67, 56 and 57 to 66. As a wheel 16 turns, the wheel cutter blade 63 sweeps past the stationary cutter blade structure in a circular path about the axis 29 or 58 of the respective axle 27 or 28. When the movable wheel cutter blade 63 passes the stationary axle cutter blade structure 31, 46, any refuse material entrained by a wheel 16 and tending to be wrapped about the axle is cut or sheared by the respective cutting edges or is at least scored by such edges if not fully severed. The cut or scored material is, consequently, unable to entwine itself around an axle and build-up in the wheel cavity formed by the center cone 21 of a wheel 16. At the front axle, the stationary cutter blade assembly 31, working with the wheel cutter blade assembly 61 presents cutting surfaces that lie in different planes, both parallel to the axis and transverse to the axis of the axle 27. As a consequence, these cutting edges are adapted to efficiency sever refuse regardless of the orientation that such material assumes when it enters the zone adjacent the inside face of a wheel 16.

At the rear axle 28, the double-cutting edges 56 and 57 provide an efficient cutting structure with the respective wheel cutter assemblies 61 since, upon each revolution of a wheel 16, refuse material can be double-cut, one time at each edge 56 and 57. Since refuse material is being carried up in one instance and being carried down in the other instance, there is assurance that such material, even if biased in some manner, will be adequately cut or scored by the cutting blades. The cutter blades 31, 46 and 61 are bi-directional and work efficiently in either direction of wheel rotation.

The disclosed cutter arrangement is particularly suited for retrofitting compactors in the field. A kit of axle and wheel cutter blade weldment assemblies is provided generally as described above for a particular model of tractor or compactor and wheel style fitted to such compactor. The wheels are preferably removed to facilitate welding of the cutting assemblies on the chassis or axles and the wheels. When the cutter assemblies have been welded up on the chassis or axles and on the wheels, the wheels are replaced on their axles. It has been found that a particularly efficient technique of fitting a set of stationary and rotating cutter blades is to initially provide the stationary cutter assemblies with extra stock in the cutter plate at the cutting edge so that there is some interference between the stationary and rotating cutter plates or blades. Each wheel is manually rotated until the wheel cutter plate contacts the stationary cutter plate. Then, a cutting torch is used to burn the interfering material away from the stationary cutter plate leaving a slight clearance of about ⅛ inch between the resulting cutting edge and the wheel cutting edge.

It should be evident that this disclosure is by way of example and that various changes may be made by adding, modifying or eliminating details without departing from the fair scope of the teaching contained in this disclosure. For example, the cutter blades can be forged or cast with integral reinforcement gussets or ribs. The invention is therefore not limited to particular details of this disclosure except to the extent that the following claims are necessarily so limited.

I claim:

1. A self-propelled multi-wheeled compactor for refuse comprising a chassis, a pair of spaced axles on the chassis, a set of wheels rotatably mounted on the axles, an engine and a drive train on the chassis for driving at least one of said wheels for rotation on an axle, one axle having a pair of spaced wheels, said spaced wheels each having an inboard side facing towards the chassis, each of said spaced wheels having a cutter blade mounted on its inboard side at a location that revolves in a path around its associated axle, a stationary cutter blade associated with each of said spaced wheels rigidly mounted with respect to the associated axle at a location generally tangent to the path of the revolving cutter blade, the rotational and stationary cutter blades having cooperating cutting edges that operate to shear refuse that tends to be entrained by the associated wheel and wrapped around the associated axle, at least a portion of the cutting edge of the revolving cutter blade being spaced from the respective wheel a distance that is substantially greater than ten times the operating clearance between the cutting edges, each stationary blade having a cross-cut portion generally parallel to the associated axle and a radial cut portion lying in a plane generally perpendicular to the axle, said rotational cutter blade having cutting edge portions complimentary to both of said stationary cutting blade edge portions.

2. A self-propelled multi-wheeled compactor for refuse comprising a chassis, a pair of spaced axles on the chassis, a set of wheels rotatably mounted on the axles, an engine and a drive train on the chassis for driving at least one of said wheels for rotation on an axle, one axle having a pair of spaced wheels, said spaced wheels each having an inboard side facing towards the chassis, each of said spaced wheels having a cutter blade mounted on its inboard side at a location that revolves in a path around its associated axle, a stationary cutter blade associated with each of said spaced wheels rigidly mounted with respect to the associated axle at a location generally tangent to the path of the revolving cutter blade, the rotational and stationary cutter blades having cooperating cutting edges that operate to shear refuse that tends to be entrained by the associated wheel and wrapped around the associated axle, at least a portion of the cutting edge of the revolving cutter blade being spaced from the respective wheel a distance that is substantially greater than ten times the operating clearance between the cutting edges, each stationary blade having a pair of parallel cutting edges, each of said parallel cutting edges being arranged to cooperate with the rotating cutter blade at an angular position of the wheel remote from the angular position of the wheel at which the other parallel cutting edge cooperates with the rotating cutter blade.

* * * * *